United States Patent

Golestan et al.

[11] Patent Number: 5,174,330
[45] Date of Patent: Dec. 29, 1992

[54] CONSTANT FLOW RATE CONTROL VALVE WITH LOW PRESSURE DROP START

[75] Inventors: Farhad Golestan; Trung K. Pham, both of Dallas; David I. Sexton, Jr., DeSoto, all of Tex.

[73] Assignee: Flow Design, Inc., Dallas, Tex.

[21] Appl. No.: 803,198

[22] Filed: Dec. 5, 1991

[51] Int. Cl.⁵ .............................................. G05D 7/01
[52] U.S. Cl. ................................................... 137/504
[58] Field of Search .......................................... 137/504

[56] References Cited

U.S. PATENT DOCUMENTS

| | | | |
|---|---|---|---|
| 3,015,341 | 1/1962 | Hedland et al. | 137/493 |
| 3,130,747 | 4/1964 | Benaway | 137/504 |
| 3,131,716 | 5/1964 | Griswold et al. | 137/503 |
| 3,339,580 | 9/1967 | Cutler | 137/504 |
| 3,752,183 | 8/1973 | Griswold | 137/504 |
| 3,752,184 | 8/1973 | Griswold | 137/504 |
| 3,756,272 | 9/1973 | Hammond | 137/504 X |
| 4,766,928 | 8/1988 | Golestaneh | 137/504 |
| 5,054,516 | 10/1991 | Okerblom | 137/504 |

Primary Examiner—Robert G. Nilson
Attorney, Agent, or Firm—Baker & Botts

[57] ABSTRACT

A constant flow rate control valve (10) is provided including a cup member (12) disposed in a flow passage through the valve (10). The cup member has an orifice (18) located in an end wall (14) of the cup member (12) and a plurality of side ports (22) in a side wall (16) of the cup member (12). The cup member (12) is moveable axially within the valve (10), with such movement being opposed by a resilient spring member (30) downstream of the cup member (12). The valve (10) includes a fixed retainer ring (26) in a valve body (24) surrounding the side wall (16) of the cup member (12) which blocks or exposes areas of the side ports (22) in response to movement of the cup member (12). Start up slots (34) in a side wall (36) of the valve body (24) are also blocked or exposed in response to movement of the cup member (12). Fluid pressure acting on the end wall (14) of the cup member (12) urges the cup member (12) against the spring (30), so that the retainer ring (26) exposes only that side port (22) area appropriate to the pressure being exerted and the cup member (12) exposes only that start up slot (34) area appropriate to the pressure being exerted.

17 Claims, 2 Drawing Sheets

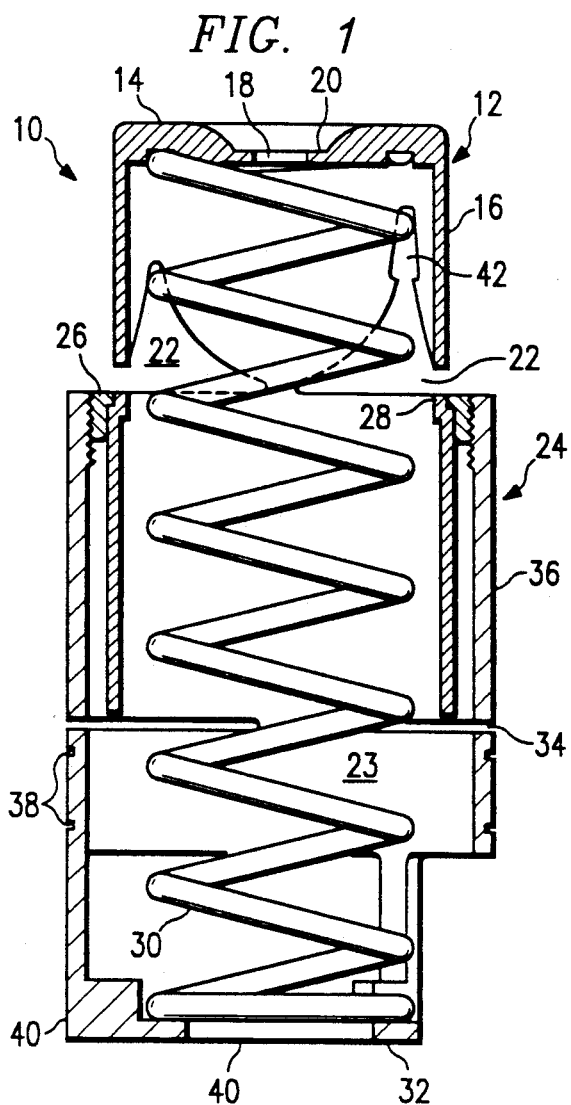
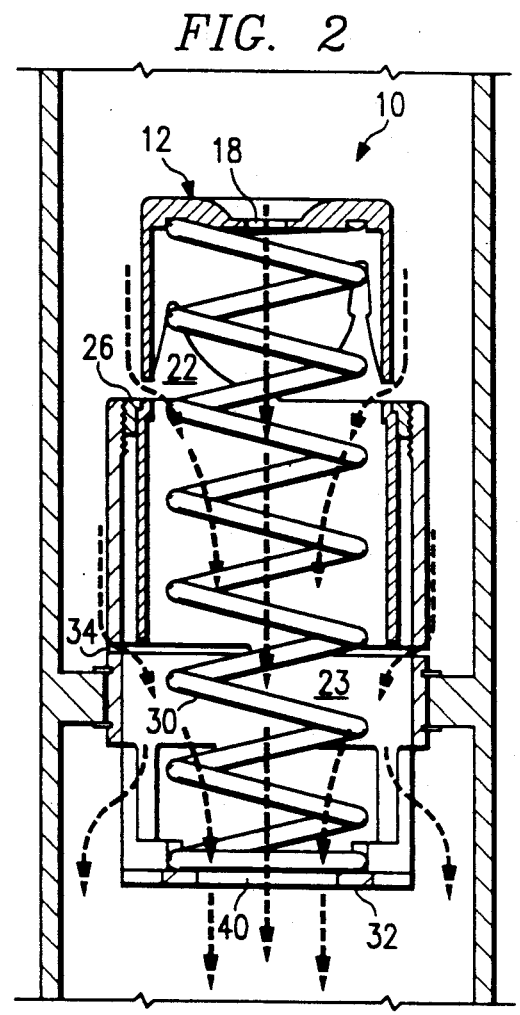
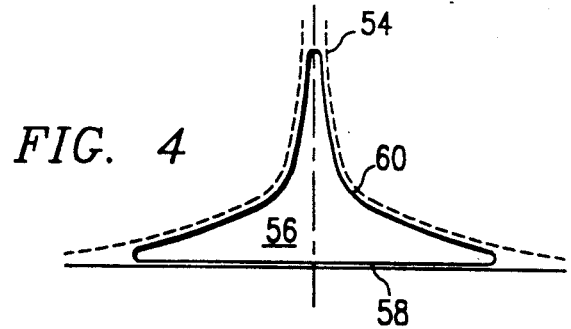
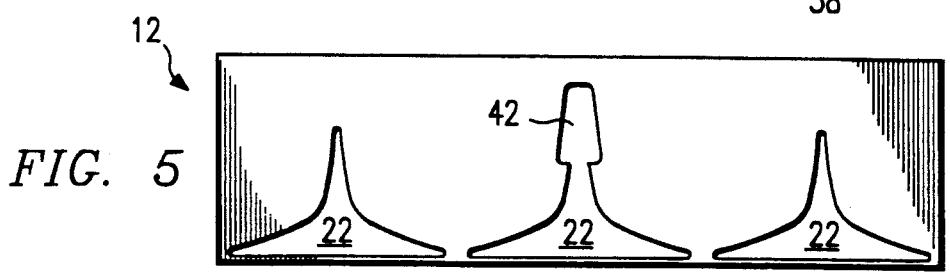

CONSTANT FLOW RATE CONTROL VALVE WITH LOW PRESSURE DROP START

TECHNICAL FIELD OF THE INVENTION

The present invention pertains in general to constant flow rate control valves and more particularly to a control valve where the constant flow rate is achieved at a lower pressure drop across the valve and the constant flow rate is maintained to a higher pressure drop across the valve.

BACKGROUND OF THE INVENTION

Constant flow rate control valves have numerous applications in piping networks. For example, in a building air conditioning and heating system, water or other liquid at an appropriate control temperature is pumped from a central station through a piping network to various heat exchange units located throughout the building. Some of these heat exchange units are located relatively close to the central station while others are located much farther away. The fluid pressure applied across inputs and outputs of the respective heat exchange units varies widely because of factors such as frictional losses inherent in the flow of the liquid through the piping network and the distances the liquid must travel.

The flow rate in each branch of the network is a direct function of the pressure drop existing across that branch. Two contributors to the existence and magnitude of the pressure drop are line friction and equipment pressure drop. The actual pressure drop of a branch is often different from the original desired or, designed value, leading to a flow rate in that branch which is different from the desired flow rate, which also influences the flow rate of other branches. To obtain the desired flow rate in the various branches of such a network, the network must be hydraulically balanced. Hydraulic balancing often involves adding additional pressure to the system and creating wasteful pressure drops. Pumps are frequently oversized to provide the additional pressure required to balance the network. However, these pumps are operated at other than their optimum performance condition which results in wasteful energy consumption.

Previous constant flow rate control valves have alleviated the need for hydraulic balancing. Such a control valve is disclosed in U.S. Pat. No. 4,766,928 issued to Golestaneh. Golestaneh discloses a constant flow rate control valve including a movable cup member having a plurality of side ports and an orifice on an end wall of the cup member. Pressure differential across the valve moves the cup member against a resilient spring to expose that side port area appropriate for a constant flow rate at that pressure differential. There is always a minimum pressure differential required to establish the desired flow rate for the Golestaneh and other prior art control valves. For some systems, this minimum pressure drop cannot be reached. Another problem with the prior art control valves is that a control range where the flow rate is relatively constant has a maximum pressure differential above which the flow rate is no longer constant. Previous valves have been limited as to the maximum pressure differential across the valve for which a constant flow rate can be maintained.

From the foregoing, it may be appreciated that a need has arisen for a constant flow rate control valve which requires a lower minimum pressure drop than valves in the prior art in order to establish the desired flow rate. Also, a need has arisen to increase the control range of the valve to be able to maintain a constant flow rate at higher pressure differentials than valves found in the prior art.

SUMMARY OF THE INVENTION

In accordance with the present invention, a constant flow rate control valve is provided which substantially eliminates or reduces disadvantages and problems associated with prior constant flow rate control valves.

The valve includes a cup member disposed in a flow passage through a valve body. The cup member has an orifice located in an end wall of the cup member and a plurality of side ports in a side wall of the cup member. The cup member is moveable axially within the valve body, with such movement being opposed by a resilient spring member downstream of the cup member. A fixed retainer ring in the valve body surrounding the side wall of the cup member blocks or exposes areas of the side ports in response to movement of the cup member. The valve body has start up slots which are blocked or exposed by the downstream edge of the cup member in response to the movement of the cup member. Fluid pressure acting on the end wall of the cup member urges the cup member against the spring so that the retainer ring exposes only that side port area appropriate to the pressure being exerted. Similarly, fluid pressure acting on the end wall of the cup member urges the cup member against the spring such that the cup member exposes only that start up slot area appropriate to the pressure being exerted.

The present invention provides technical advantages over other constant flow rate control valves within the prior art. One technical advantage is the use of start up slots in the valve body to reduce the minimum pressure drop required for the control valve to reach its desired flow rate. Another technical advantage is the configuration of the orifice in the end wall of the cup member to help extend the constant flow at higher pressure differentials.

BRIEF DESCRIPTION OF THE DRAWINGS

For a more complete understanding of the present invention and the advantages thereof, reference is now made to the following description taken in conjunction with the accompanying drawings in which:

FIG. 1 is an axial sectional view of the constant flow rate control valve.

FIG. 2 is an axial sectional view of the constant flow rate control valve showing the fluid flow paths through the valve.

FIG. 4 is a graph of the ideal side port area with a preferable side port area superimposed therein.

FIG. 5 is a diagrammatic developed view of the layout of the side ports of the side wall of the cup member.

DETAILED DESCRIPTION OF THE INVENTION

Figure 3:
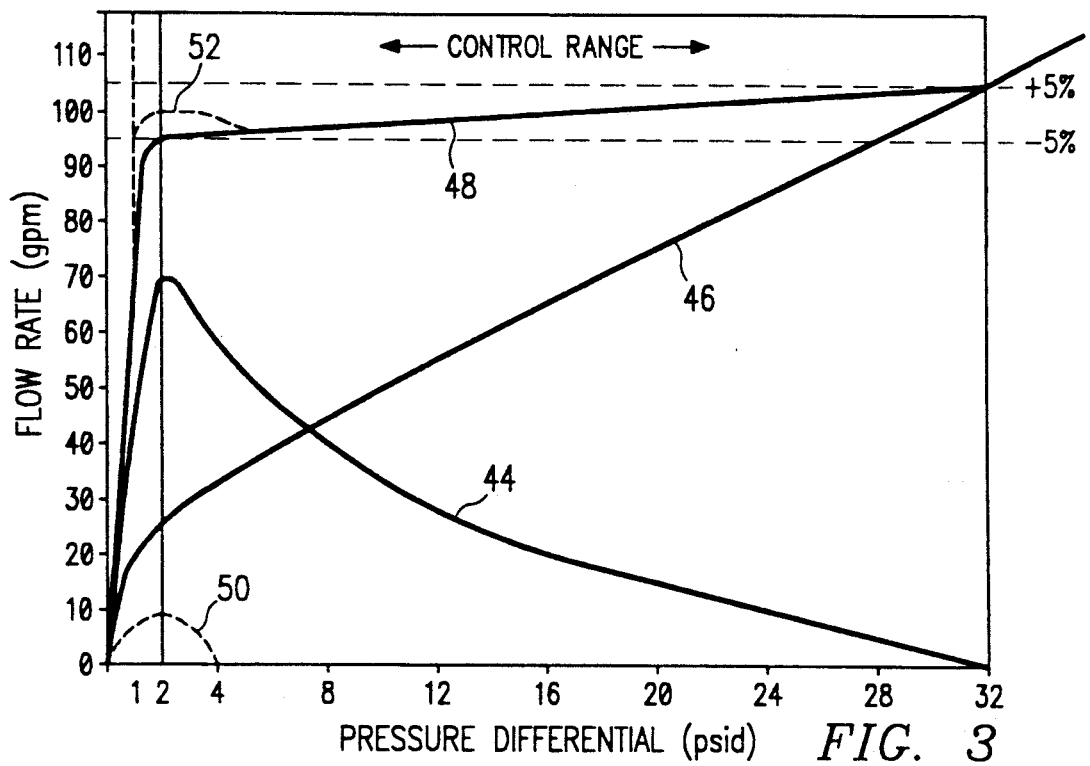
FIG. 3 is a graph of the flow rates through each valve opening separately and the total flow rate through the valve.

Referring to FIG. 1, there is illustrated an axial sectional view of the constant flow rate control valve 10 of the invention. The valve 10 is comprised of a cup member 12 having an end wall 14 and a side wall 16. The cup member 12 is preferably provided with a single orifice 18 in the center of the end wall 14. However, a plurality of orifices (not shown) can also be provided to adjust the fluid flow through the valve 10. The orifice 18 has a configured edge 20 to control the rate of increase of fluid flowing through the orifice 18 as the fluid pressure differential increases. The side wall 16 has a plurality of side ports 22 extending therethrough. The cup member 12 is movably disposed within a flow passage 23 of a valve body 24.

A retainer ring 26 is provided within the valve body 24 to limit axial movement of the cup member 12 in one direction. When no fluid is flowing through the valve 10, a surrounding flange 28 on the cup member 12 is urged against the downstream side of the retainer ring 26 by the force of a partially compressed spring 30. The spring 30 is partially compressed between the downstream side of the end wall 14 of the cup member 12 and the upstream side of an end wall 32 of the valve body 24. The valve body 24 is threaded to the retainer ring 26 which allows the retainer ring 26 to be set at a selected distance from the end wall 32 of the body 24. Such distance variation can be utilized to compensate for differences in springs 30 that result from manufacturing tolerances. In many prior art valves, shims were inserted in the valve to compensate for such minor spring variations.

A plurality of start up slots 34 extend through a side wall 36 of the valve body 24. Retainer grooves 38 in the side wall 36 of the valve body 24 provide one way that the valve 10 can be installed into the liquid flow path of a piping network. However, the valve 10 can be adapted for such installation by other methods well known in the art. The valve body 24 has an outlet 40 to allow fluid to exit from the flow passage 23 in the valve 10.

The side ports 22 and the start up slots 34 are totally open to fluid flow when no fluid is flowing through the valve 10. FIG. 2 depicts the fluid flow path through the valve 10. Fluid enters the valve 10 through the orifice 18, the side ports 22, and the start up slots 34 and proceeds into the flow passage 23 of the valve body 24 where it exits through the outlet 40 and other perimeter outlets. Once fluid is flowing, a pressure differential is established in the liquid between the end wall 14 and the end wall 32. The orifice 18, the side ports 22, and the start up slots 34, which are located in the flow path of the fluid through the valve 10, restrict fluid flow therethrough. A substantial portion of the pressure differential occurs across the orifice 18, the side ports 22, and the start up slots 34. This differential pressure acting on the upstream and downstream surfaces of the end wall 14 produces a net downstream force on the cup member 12, which force compresses the spring 30. A greater pressure drop causes downstream movement of the cup member 12 and a greater compression of the spring 30. The axial movement of the cup member 12 within the valve 10 varies the effective area of the side ports 22 and the start up slots 34. The effective area of the side ports 22 is changed as the side ports 22 move relative to the retainer ring 26. The effective area of the start up slots 34 is changed as the downstream end of the cup member 12 moves past the start up slots 34. This variation in the area of the side ports 22 and the start up slots 34 is responsive to the pressure differential acting on the end wall 14 of the cup member 12.

The valve 10 incorporates basic fluid mechanics relationships, specifically Bernouli's equation for flow. The flow through a circular opening in a plate is governed by the equation:

$$Q = KA \sqrt{(DP)} \tag{1}$$

where,
Q = flow rate,
K = flow coefficient,
A = area of the opening in the plate, and
DP = pressure differential imposed across the plate.

To provide a controlled rate of flow when a varying pressure differential exists, the area of the opening must be constantly changed to provide a constant flow rate condition. In the valve 10, the cup member 12 functions as a piston and spring combination to provide an axial movement responsive to the pressure variation. The size of the orifice 18 is selected to allow the passage of the desired flow rate Q at the maximum pressure differential of a desired control range. The desired control range is a range of pressure differentials in which the constant flow rate is achieved. The portion of flow which will pass through the orifice 18 is given by equation (1) set forth above.

FIG. 3 is a graph of the flow curves for each opening in the valve 10 and shows the constant flow curve for the combination of the openings in the valve 10. Flow curve 44 represents the flow rate of the present invention through the side ports 22 only. As the pressure differential increases, the area of the side ports 22 decrease resulting in less flow through the side ports 22. Flow curve 46 represents the flow rate through the orifice 18 only. Flow curve 48 represents the combined flow rate of the present invention through both the orifice 18 and the side ports 22. At any pressure differential less than the maximum of the desired control range, flow must occur through the variable area side ports 22 of the cup member 12. The side ports 22 have a greater area and flow higher volumes at lower pressure differentials and gradually decrease to no flow where the side ports 22 are closed at the upper limit of the pressure differential. The combination of the flow through the orifice 18 and the variable flow through the side ports 22 result in a constant flow rate through the valve 10 for the desired control range as shown by the flow curve 48. Flow curve 50 represents the flow rate through the start up slots 34. The flow rate through the start up slots 34 occurs at the low end of the pressure scale and thus has an effect on the combined flow curve 48 only at the lowest pressure differentials. Flow curve 52 represents the enhancement to the combined flow curve 48 due to the use of the start up slots 34. The start up slots 34 permit additional flow at the lowest pressure differentials to reduce the minimum pressure differential necessary to establish a constant flow rate. For example, and in previous valves, the lower end of the control range for a constant flow rate started at a minimum pressure differential of about 2 psid. The addition of the start up slots 34 reduces the minimum pressure differential of the control range by providing a greater flow area at low pressure. In the example, the additional flow area provided by the start-up slots 34 reduces the minimum pressure differential for start of a constant flow rate to about 1 psid.

The relationship between the area of the variable area side ports 22 and the pressure differential across the valve is:

$$A = \frac{Q}{K\sqrt{(DP)}} \quad (2)$$

The rate of change of A with respect to the differential pressure is:

$$\frac{dA}{d(DP)} = -\frac{1}{2}\frac{Q}{K}(DP)^{-\frac{3}{2}} \quad (3)$$

The incremental variation of area is:

$$\frac{A1 - A2}{DP1 - DP2} \quad (4)$$

This area is also a function of the compression of the spring 30 and of the linearity or non-linearity of the preferred spring 30. The amount of the axial movement of the cup member 12 is calculated by the amount of pressure differential existing across the end wall 14 of the cup member 12 and a characteristic of the spring constant. The shape of this area can be obtained by solving equation (4) using a finite difference method. FIG. 4 is a graph of an ideal port shape 54 of the side ports 22 represented by dashed lines. Superimposed on the graph and represented by solid lines is a preferred shape 56 of the side port 22 extending through the side wall 16 of the cup member 12. The preferred shape 56 has a triangular type configuration with a flat base 58 as its downstream side and two parabolic sides 60 extending toward the end wall 14. FIG. 5 is a two dimensional depiction of one variation of the side wall 16 and the side ports 22 as though the side wall had been unrolled.

Depending on the flow rate desired, a larger or smaller orifice 18 and larger or smaller side ports 22 or a greater or lesser number of side ports 22 may be utilized. As shown in the graph of FIG. 4, the width of these port areas stretch to infinity. However, it is physically impossible to place such an area on the cup member 12. Thus, the start up slots 34 compensate for the ideal infinite width of the ideal port shape 54. Similarly, an extended area 42 compensates for the differences between the ideal infinite height of the ideal port shape 54 and the height of port 22 that can be manufactured in the body 24. The truncation of the ideal port shape 54 width in the prior art as represented by the preferred shape 56 compromised the starting pressure at which the valve 10 will have a constant flow. The start up slots 34 supplement this truncation of the ideal port shape by allowing for a constant flow rate at a starting pressure lower than that found in the prior art.

Figure 6A:
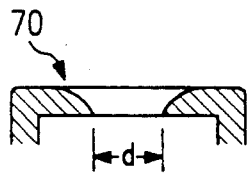
FIGS. 6A-6D depict various orifice configurations.
Figure 6B:
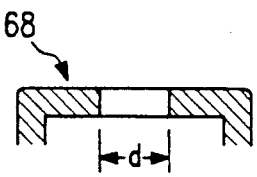
Figure 6C:
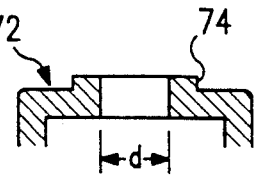
Figure 6D:
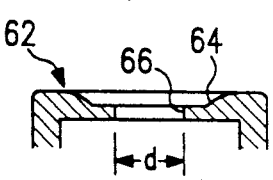
Figure 6:
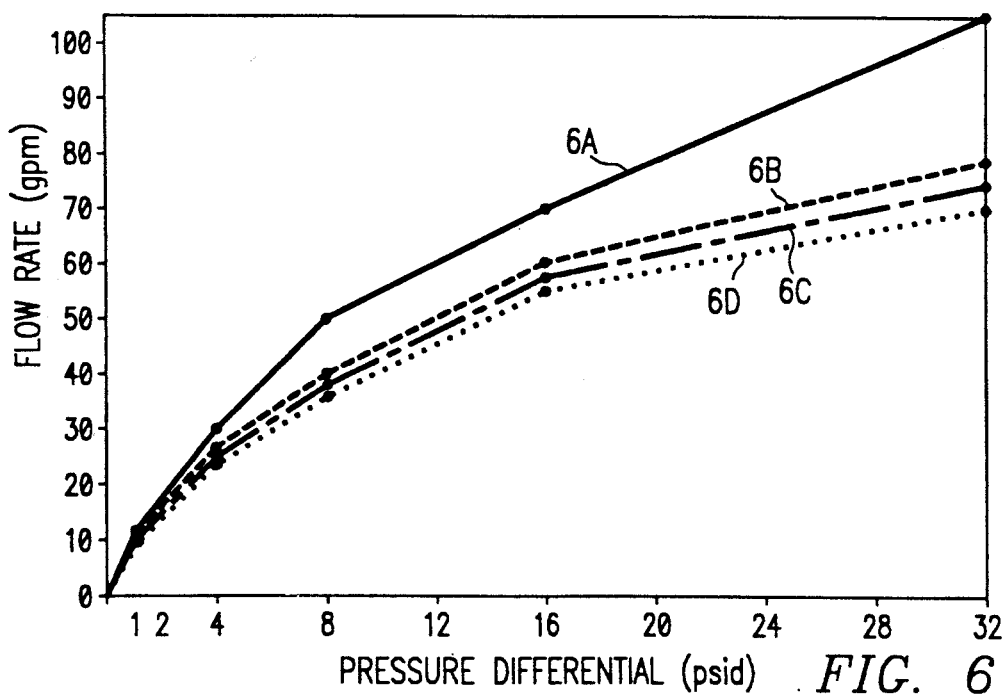
FIG. 6 is a graph of the flow rates through the orifice for various orifice configurations.

The upper end of the control range of the valve 10 is affected by the shape of the configured edge 20 of the orifice 18. FIG. 6 depicts flow curves for different configurations of the orifice 18 and the corresponding configurations are shown in FIGS. 6A-6D. To increase the control range of the valve 10 at higher pressure differentials, the ideal configuration of the orifice 18 preferably yields a flow curve which approaches a horizontal slope. FIG. 6D depicts a curved step configuration 62 of the configured edge 20 consisting of an upstream rounded portion 64 and a downstream flange portion 66 extending from the rounded portion 64. The corresponding flow curve for the curved step configuration 62 better approximates the horizontal slope than the corresponding flow curves of a square edge configuration 68 as shown in FIG. 6B or a rounded edge configuration 70 as shown in FIG. 6A which is found in the prior art. FIG. 6C depicts a raised edge configuration 72 consisting of a flange 74 extending upstream from the end wall 14 and its corresponding flow curve is also illustrated in the graph of FIG. 6. The raised edge configuration 72 does not create as much turbulence as the curved step configuration 62 as shown by the difference in their flow curves of FIG. 6. The curved step configuration 62 of FIG. 6D causes more turbulence around the end wall 14 thus affecting the fluid flow through the orifice 18. By providing more restriction as the pressure differential increases, the curved step configuration 62 increases the control range of the valve 10 to allow for a constant flow rate at higher pressure differentials than valves within the prior art.

Thus, it is apparent that there has been provided, in accordance with the invention, a constant flow rate control valve that fully satisfies the object, aims, and advantages set forth above. Although the preferred embodiment has been described in detail, it should be understood that various changes, substitutions, and alterations can be made therein without departing from the spirit and scope of the invention as defined by the appended claims.

What is claimed is:

1. A control valve comprising:
   a valve body having at least one first orifice extending therethrough and a flow passage within said valve body;
   a cup member within said flow passage, said cup member having a side wall and an end wall defining an interior of said cup member, said side wall having at least one second orifice extending therethrough, said end wall having at least one third orifice extending therethrough such that fluid flows through said first orifice and said second orifice and said third orifice into said flow passage, said cup member movably disposed in said valve body to vary the area of said first orifice and said second orifice such that the total flow of fluid through said first orifice and said second orifice and said third orifice into said flow passage is substantially constant over a range of pressure differentials across the valve.

2. The valve of claim 1 and further comprising means resiliently urging said cup member against said fluid flow.

3. The valve of claim 2 wherein said resilient means is a spring.

4. The valve of claim 2 and further comprising a retainer ring restricting the upstream movement of said cup member.

5. The valve of claim 2 wherein said retainer is selectively moveable relative to said valve body to permit adjustment of the force exerted by said means resiliently urging said cup member against fluid flow.

6. The valve of claim 1 wherein said end wall has a configured edge defining said third orifice to limit the fluid flow through said third orifice at higher pressure differentials by producing more turbulence around said third orifice.

7. The valve of claim 6 wherein said configured edge has an upstream rounded portion and a downstream flange portion protruding from said rounded portion into said third orifice.

8. The valve of claim 6 wherein said configured edge has a raised flange extending upstream from said end wall.

9. The valve of claim 6 wherein said configured edge is squared off.

10. The valve of claim 6 wherein said configured edge is rounded.

11. The valve of claim 1 wherein said first orifice is arranged circumferentially about said valve body and has an upstream edge located adjacent a downstream end of said cup member.

12. The valve of claim 11 wherein said second orifice has a downstream edge located adjacent an upstream end of said valve body whereby movement of said cup member in response to a pressure differential across the valve moves said cup member in a downstream direction reducing the flow area of said first orifice and said second orifice thereby providing a controlled flow rate at different liquid pressures.

13. The valve of claim 4 wherein said retainer ring has an upstream end located adjacent a downstream edge of said second orifice whereby movement of said cup member in response to a pressure differential across the valve moves said cup member in a downstream direction reducing the flow area of said second orifice, thereby providing a controlled flow rate at different liquid pressures.

14. The valve of claim I wherein said second orifice has a generally triangular configuration with a flat downstream side and two sides extending parabolically from said downstream side toward said end wall.

15. The valve of claim 14 wherein said parabolic sides terminate into a larger area.

16. A control valve comprising:
a valve body having a flow passage;
a cup member within said flow passage, said cup member having a side wall and an end wall defining an interior of said cup member, said side wall having at least one first orifice extending therethrough, said end wall having at least one second orifice extending therethrough such that fluid flows through said first orifice and said second orifice into said flow passage, said cup member movably disposed in said valve body to vary the area of said first orifice such that the total flow of fluid through said first orifice and said second orifice into said flow passage is substantially constant over a range of pressure differentials across the valve, said end wall having a configured edge defining said second orifice to limit the fluid flow through said second orifice at higher pressure differentials by producing more turbulence around said second orifice, said configured edge having an upstream rounded portion and a downstream flange portion protruding from said rounded portion into said second orifice.

17. A control valve comprising:
a valve body having a flow passage;
a cup member within said flow passage, said cup member having a side wall and an end wall defining an interior of said cup member, said side wall having at least one first orifice extending therethrough, said end wall having at least one second orifice extending therethrough such that fluid flows through said first orifice and said second orifice into said flow passage, said cup member movably disposed in said valve body to vary the area of said first orifice such that the total flow of fluid through said first orifice and said second orifice into said flow passage is substantially constant over a range of pressure differentials across the valve, said end wall having a configured edge defining said second orifice to limit the fluid flow through said second orifice at higher pressure differentials by producing more turbulence around said second orifice, said configured edge having a flange protruding from said end wall into said second orifice.

* * * * *